United States Patent
Suzuki et al.

(10) Patent No.: US 6,452,894 B2
(45) Date of Patent: Sep. 17, 2002

(54) RECORDING MEDIA LIBRARY APPARATUS HAVING A MEDIUM INVERSION UNIT SEPARATED FROM A TRANSPORT MECHANISM

(75) Inventors: Hiroyuki Suzuki, Hadano; Katsumasa Yokoyama, Naka-gun, both of (JP)

(73) Assignee: Hitachi Electronics Engineering Co., Ltd., Tokyo (JP)

( * ) Notice: Subject to any disclaimer, the term of this patent is extended or adjusted under 35 U.S.C. 154(b) by 0 days.

(21) Appl. No.: 09/357,751

(22) Filed: Jul. 20, 1999

(30) Foreign Application Priority Data

Jul. 24, 1998 (JP) ............................................ 10-209335

(51) Int. Cl.[7] .............................................. G11B 17/26
(52) U.S. Cl. ..................................... 369/200; 369/30.39
(58) Field of Search ................................ 369/178, 199, 369/200, 30.39; 360/92

(56) References Cited

U.S. PATENT DOCUMENTS

| | | | | |
|---|---|---|---|---|
| 4,123,066 A | * | 10/1978 | Minemura et al. | 369/200 |
| 4,447,900 A | * | 5/1984 | Shatteman et al. | 369/200 |
| 5,056,073 A | * | 10/1991 | Fitzgerald et al. | 369/36 |
| 5,062,092 A | * | 10/1991 | Siryj et al. | 369/38 |
| 5,502,697 A | * | 3/1996 | Taki | 369/34 |
| 5,546,366 A | * | 8/1996 | Dang | 369/36 |
| 5,610,882 A | * | 3/1997 | Dang | 369/36 |
| 5,742,570 A | * | 4/1998 | Taki et al. | 369/36 |
| 5,943,305 A | * | 8/1999 | Fitzgerald et al. | 369/36 |
| 5,959,803 A | * | 9/1999 | Okamoto et al. | 360/92 |
| 5,995,459 A | * | 11/1999 | Kappel et al. | 369/36 |
| 5,999,356 A | * | 12/1999 | Dimitri et al. | 360/71 |
| 6,041,026 A | * | 3/2000 | Hammar et al. | 369/36 |
| 6,285,648 B1 | * | 9/2001 | Philipps | 369/195 |
| 6,359,855 B1 | * | 3/2002 | McPherson et al. | 369/191 |

FOREIGN PATENT DOCUMENTS

| | | | |
|---|---|---|---|
| JP | 63-113969 | * | 5/1988 |
| JP | 8-249782 | | 9/1996 |
| JP | 11-162082 | * | 6/1999 |

* cited by examiner

*Primary Examiner*—Brian E. Miller
(74) *Attorney, Agent, or Firm*—Morrison & Foerster LLP

(57) ABSTRACT

The present invention provides a recording media library apparatus that includes an inversion unit for inverting a desired or designated recording medium of the double-side recording type so as to correspond to a predetermined driving direction of a drive unit. The inversion unit is installed in any one of multiple of predetermined installing areas separate from a transport mechanism within the library apparatus. By the inversion unit performing necessary inversion of the double-side recording type medium, the same transport mechanism can be used for recording media of both the double-side recording type and the single-side recording type.

4 Claims, 2 Drawing Sheets

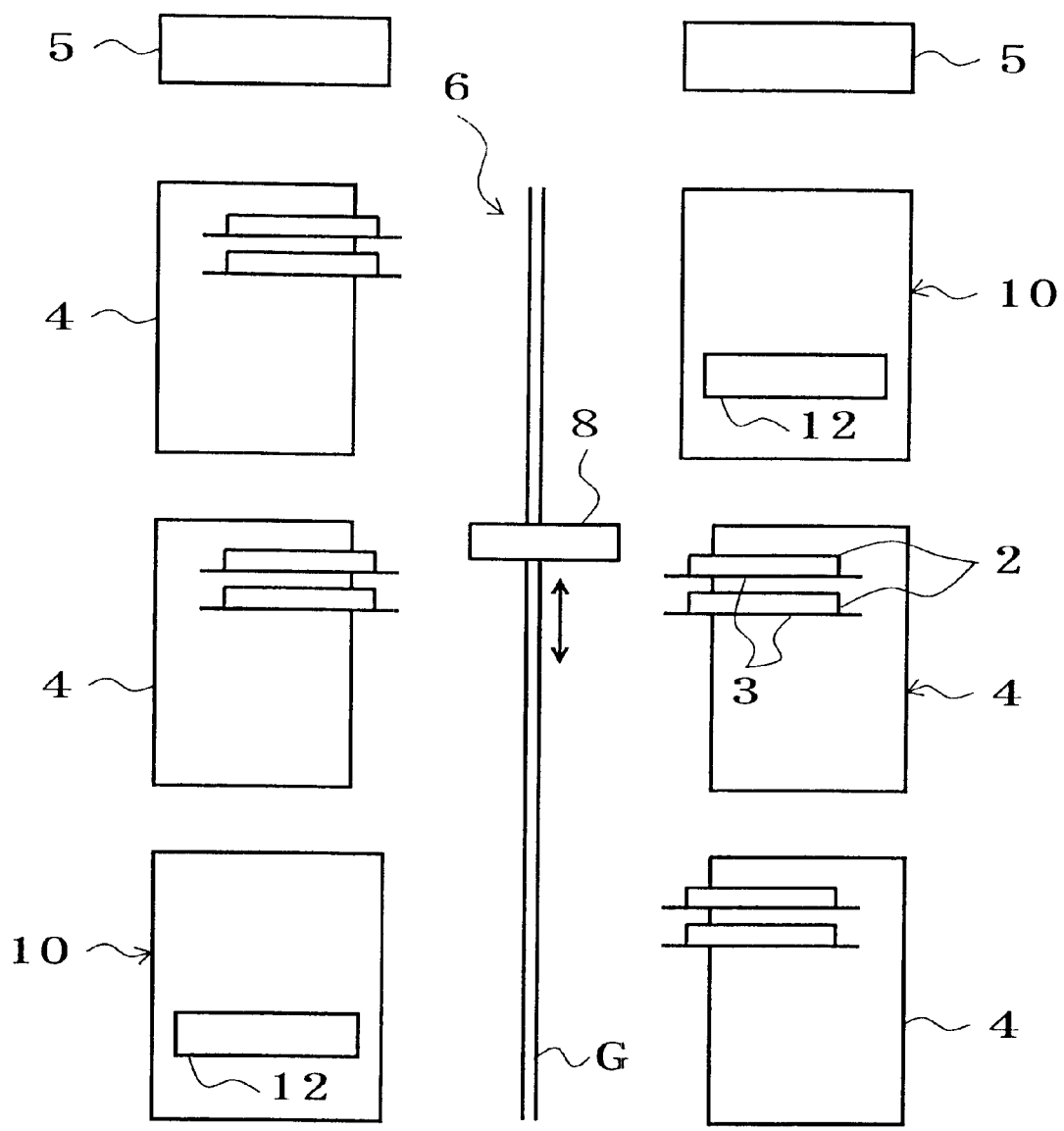
F I G. 1

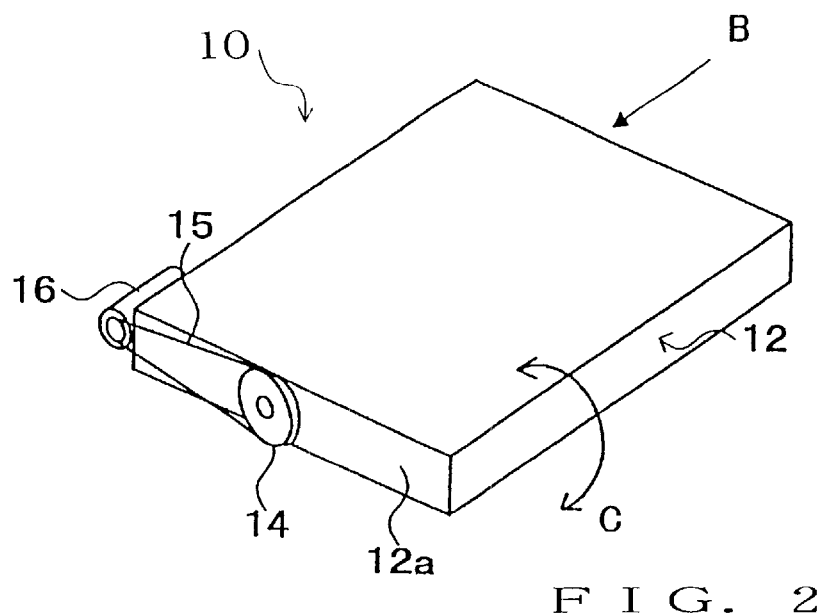
F I G. 2
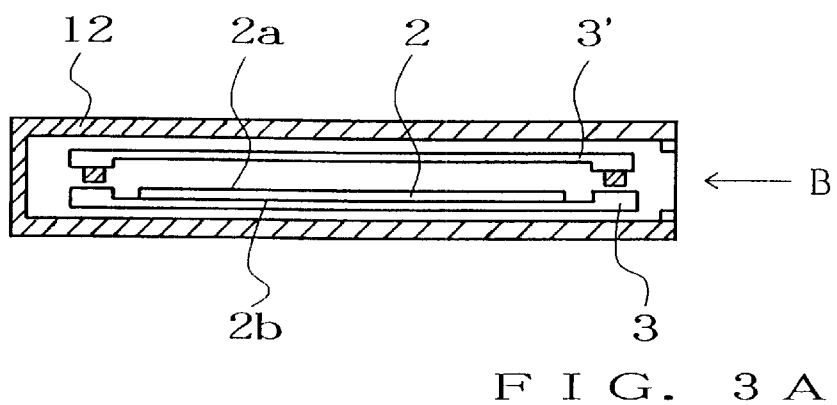
F I G. 3A
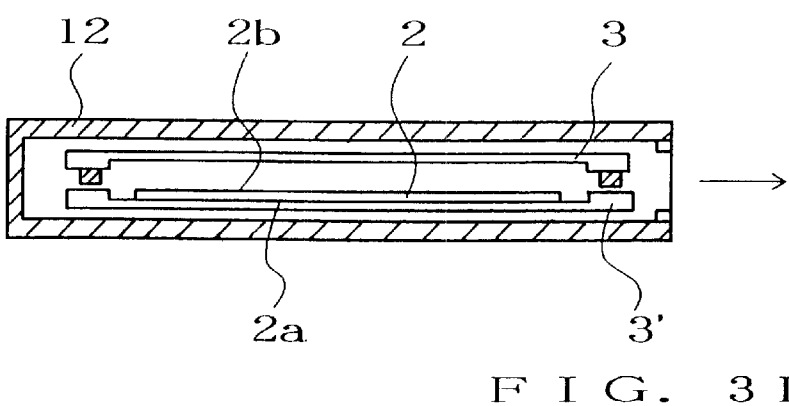
F I G. 3B

RECORDING MEDIA LIBRARY APPARATUS HAVING A MEDIUM INVERSION UNIT SEPARATED FROM A TRANSPORT MECHANISM

BACKGROUND OF THE INVENTION

The present invention relates generally to recording media library apparatus, and more particularly to a recording media library apparatus for storing and handling or processing at least recording media of a double-side recording type which, without sacrificing or lowering the processing efficiency and speed, is capable of inverting a designated double-side recording type medium so as to be oriented in a predetermined direction where it can be driven by a drive unit.

DVD (Digital Versatile Disk) library apparatus have been known extensively today, which store and drive (read/write) DVDs and perform other necessary processing on the DVDs. The DVD library apparatus, in general, include a magazine for storing a multiplicity of DVDs in storage cells thereof, a drive unit for driving (reading/writing) a desired or designated DVD, and a transport mechanism (also called a "handling mechanism") for transporting a designated DVD between the magazine, the drive unit etc. Typically, the DVD library apparatus include a plurality of (e.g., six) magazines removably installed therein, each of which is capable of storing a multiplicity of DVDs. When a DVD stored in a particular storage cell of one of the magazines is to be driven by the drive unit, a carrying holder, usually in a box-like shape, of the transport mechanism is first moved to a position where it faces the particular storage cell, and then pulls the DVD out of the particular storage cell until the DVD is held in place within the holder. Then, the carrying holder is moved, along with the DVD held therein, to a position where it faces the drive unit, and inserts the DVD into the drive unit for necessary driving.

Although the drive unit can always drive only one predetermined surface (lower or upper surface) of each DVD, the DVDs marketed today are of not only a single-side recording type but also a double-side recording type such as DVD-RAMs. For this reason, in such DVD library apparatus mixedly storing and handling the DVDs of both the single-side recording type and the double-side recording type (hereinafter also called "single-side recording type DVDs" and "double-side recording type DVDs", respectively), there sometimes arises a need for inverting or turning the double-side recording type DVD upside down (or inside out) so as to be oriented in a predetermined direction corresponding to the driving direction of the drive unit. Thus, in some of the conventionally-known DVD library apparatus, the transport mechanism includes an inversion unit for inverting the double-side recording type DVD so as to be oriented in the predetermined driving direction (i.e., so as to correspond to the driving direction of the drive unit), as typically disclosed in Japanese Patent Laid-open Publication No. HEI-8-249782.

However, these conventional DVD library apparatus including the inversion unit in the transport mechanism is very disadvantageous in that the transport mechanism can not perform its primary operation, i.e., DVD transport operation, during the inversion of the DVD by the inversion unit, which would significantly lower the DVD transporting efficiency and hence the processing capability or performance of the entire library apparatus.

SUMMARY OF THE INVENTION

It is therefore an object of the present invention to provide a recording media library apparatus which, without lowering its processing performance, can invert a recording medium of the double-side recording type so as to correspond to a predetermined driving direction of a drive unit.

To accomplish the above-mentioned object, the present invention provides a recording media library apparatus which is capable of storing and processing at least recording media of the double-side recording type and which comprises: a plurality of storage units, removably installed in a plurality of predetermined installing areas within the recording media library apparatus, for storing a multiplicity of the recording media; a drive unit for driving a desired one of the recording media in a predetermined driving direction; a transport mechanism for transporting a desired one of the recording media between one of the storage units and the drive unit; and an inversion unit, installed in any one of the plurality of predetermined installing areas. When a desired recording media of the double-side recording type is to be driven at a particular surface thereof, the inversion unit inverts the recording medium of the double-side recording type to correspond to the predetermined driving direction of the drive unit.

In the recording media library apparatus of the present invention, the inversion unit for inverting a desired or designated recording medium of the double-side recording type is installed in any one of the plurality of predetermined installing areas separate from the transport mechanism. Because the inversion unit in the present invention is provided separately from the transport mechanism, the inversion of one recording medium by the inversion unit and the transport of another recording medium by the transport mechanism can be effected concurrently in a parallel fashion, which can greatly enhance the processing speed and hence the processing performance of the library apparatus. Particularly, in the present invention, the transport mechanism itself does not perform the function of inverting the recording medium and thus does not have to halt or wait its medium transporting operation due to the medium inversion as in the prior art apparatus, so that the transport mechanism can perform the medium transporting operation with greatly increased efficiency.

Most preferably, the recording media library apparatus of the present invention is capable of mixedly storing recording media of both the single-side recording type and the double-side recording type, and the inversion unit can be removably installed in any selected one of the installing areas. Thus, the installed position of the inversion unit relative to the drive unit can be varied as desired depending on a frequency of necessity of inverting the double-side recording type media. That is, if the frequency of necessity of inverting the recording media is high, then the inversion unit may be provided in one of the installing areas which is closest to the drive unit so that each recording medium inverted by the inversion unit can be carried to the drive unit with a minimum travel distance after having been passed from the inversion unit to the transport mechanism. Further, a plurality of such inversion units can be provided where the frequency of necessity of inverting the recording media is extremely high. The provision of two or more inversion units can even further enhance the processing speed and performance.

Each of the storage units may be a portable magazine-type unit. The recording media may be DVDs which are bare or contained in a case.

BRIEF DESCRIPTION OF THE DRAWINGS

For better understanding of the object and other features of the present invention, its preferred embodiments will be described in greater detail hereinbelow with reference to the accompanying drawings, in which:

FIG. 1 is a schematic front view showing a general organization of a DVD (Digital Versatile Disk) library apparatus in accordance with a preferred embodiment of the present invention;

FIG. 2 is a perspective view of an inversion unit employed in the DVD library apparatus of FIG. 1, which shows an exemplary external construction of the inversion unit; and FIGS. 3A and 3B are schematic diagrams explanatory of an exemplary manner in which the inversion unit operates, and show the interior of a retainer of the inversion unit in vertical section.

DETAILED DESCRIPTION OF THE PREFERRED EMBODIMENTS

FIG. 1 is a schematic front view showing a general organization of a DVD library apparatus in accordance with a preferred embodiment of the present invention.

The DVD library apparatus shown in FIG. 1 is arranged to mixedly store and process DVDs of both the single-side recording type and the double-side recording type (i.e., single-side recording type DVDs and double-side recording type DVDs), although only the double-side recording type DVDs may be stored and processed in the library apparatus. Specifically, the DVD library apparatus includes one or more (four in the illustrated example) magazines 4, each of which is provided as a removably-installable storage unit for storing a multiplicity of DVDs 2 in storage cells thereof. The DVD library apparatus of FIG. 1 also includes one or more (two in the illustrated example) drive units 5 each provided for driving (reading/writing) a desired or designated DVD 2, and a single transport or handling mechanism 6 for transporting a designated DVD 2 between the magazine 4, the drive unit 5 etc. In the storage cells of the removable magazines 4, a plurality of the DVDs 2 (only several DVDs 2 are shown in FIG. 1 for simplicity of illustration), each not contained in a case (i.e., in an exposed or bare state), are stored along with respective trays 3 supporting thereon the DVDs 2; each of the trays 3 is reciprocatively movable back and forth into and out of the associated storage cell. The transport mechanism 6 includes a carrying holder 8, which carries a designated DVD 2 between the magazine 4, the drive unit 5 etc. by removably holding the DVD 2 and vertically moving along a transport guide shaft G.

When, for example, a DVD 2 is to be taken out of a designated one of the storage cells, the carrying holder 8 holds the tray 3, received in the designated storage cell and supporting thereon that DVD 2, at locking notches (not shown) formed in opposite side edges of a fore end portion of the tray 3 and thereby pulls out the tray 3 and the DVD 2 placed thereon out of the storage cell until the tray 3 and DVD 2 are introduced into place within the holder 8. Then, the carrying holder 8 retains together the DVD 2 and tray 3 and transports them to the drive unit 5 or other destination. However, because such a transporting operation itself is not part of the present invention and conventionally known in the art, a detailed description thereof is omitted here.

In the illustrated example, four magazines 4 and two drive units 5 are provided on opposite sides of the transport mechanism 6, two magazines 4 and one drive unit 5 on each side of the transfer mechanism 6, in order to enhance the processing performance of the library apparatus. Therefore, the single carrying holder 8 is constructed to be able to access the magazines 4 and drive units 5 on the opposite sides of the transport mechanism 6, such as by being horizontally rotated 180° (or directly without such a 180° rotation).

The DVD library apparatus according to the illustrated example has a total of six predetermined spaces or areas for removably installing six magazines 4 (hereinafter called "magazine-installing areas"). However, in the illustrated example, only four magazines 4 are installed in four of the magazine-installing areas, and in the remaining two magazine-installing areas, there are installed two inversion units 10 separately from the transport mechanism 6, each of which functions to invert or turn a designated DVD 2 of the double-side recording type upside down when necessary.

When one DVD 2 stored in a designated storage cell of one of the magazines 4 is to be driven by the drive unit 5, the carrying holder 8 of the transport mechanism 6 is moved to a position where it faces the designated storage cell, and then pulls the tray 3 out of the storage cell so that the tray 3 and the DVD 2 placed thereon are together introduced into and held in place within the carrying holder 8. If the thus-held DVD 2 is of the double-side recording type that has to be inverted, then the carrying holder 8 transports the tray 3 and DVD 2 to the inversion unit 10 located on the same side of the transport mechanism 6 as the above-mentioned magazine 4 and then sends the tray 3 and DVD 2 into the inversion unit 10. In turn, the inversion unit 10 inverts or turns the tray 3 and DVD 2 upside down so as to correspond to its predetermined driving direction. In this embodiment, during the inversion of the tray 3 and DVD 2 by the inversion unit 10, the carrying holder 8 can perform the operation of transporting another DVD 2, because each of the inversion units 10 is provided separately from the transport mechanism 6 and the transport mechanism 6 itself does not have to perform the DVD inverting function. After completion of the inversion, the inversion unit 10 sends the thus-inverted tray 3 and DVD 2 back into the carrying holder 8. Thus, the carrying holder 8 can carry the tray 3 and DVD 2, having been duly reoriented to correspond to the predetermined driving direction, into the drive unit 5 located on the same side of the transport mechanism 6.

FIG. 2 is a perspective view of the inversion unit 10, which shows an exemplary external construction of each of the inversion units 10 employed in the DVD library apparatus of FIG. 1. As shown, each of the inversion units 10 includes a retainer 12 having, for example, a generally box-like shape, into which the tray 3 and DVD 2, having been transported by the carrying holder 8 of the transfer mechanism 6, are introduced in a direction denoted by arrow B. The retainer 12 has a rotation shaft 14 secured to a central portion of one of end walls 12a thereof extending perpendicularly to the arrow-B direction, and this rotation shaft 14 is rotatable by an electric motor 16 via an endless driving belt 15. Thus, through the rotation shaft 14, the retainer 12, having the tray 3 and DVD 2 received therein, can be rotated 180° vertically as denoted by arrow C, to thereby cause the DVD 2 to be vertically inverted along with the tray 3. In this case, to prevent the DVD 2 and tray 3 from accidentally falling off the retainer 12 during or after the inversion operation, it is preferable that these DVD 2 and tray 3 received in the retainer 12 are substantially sandwiched between the upper and lower walls of the retainer 12. It should be obvious that the inversion units 10 employed in the embodiment may be modified in a variety of ways, rather than being limited to the construction illustrated in FIG. 2.

FIGS. 3A and 3B are schematic diagrams explanatory of an exemplary manner in which each of the inversion units 10 operates, and show the interior of the retainer 12 in vertical section. More specifically, FIG. 3A shows the tray 3 and the DVD 2 placed thereon when they have been introduced into place within the retainer 12 in the arrow-B direction.

Namely, in this condition, an empty tray 3' facing downward is on standby in an upper inner space of the retainer 12, and the tray 3 with the DVD 2 placed thereon is inserted underneath the empty tray 3'. The upper surface of the thus-inserted DVD 2 is denoted by reference numeral 2a. FIG. 3B shows the retainer 12 after having been inverted 180° or turned upside down from the position of FIG. 3A. In FIG. 3B, the vertical relationship between the empty tray 3' and the DVD-supporting tray 3 has been inverted from that of FIG. 3A, so that the DVD 2, having been inverted by the inversion of the retainer 12, is now placed on the tray 3'; in this position, the opposite surface 2b of the DVD 2 to the above-mentioned surface 2a faces upward or has become a new upper surface of the DVD 2. In the condition illustrated in FIG. 3B, the tray 3' with the DVD 2 placed thereon can be transferred from the retainer 12 (i.e., from the inversion unit 10) into the carrying holder 8 by pulling that tray 3' in an opposite direction to the arrow-B direction.

As the most important feature of the present invention, the inversion units 10 in this embodiment are each provided only in the magazine-installing area separately from the transport mechanism 6, not in the transport mechanism 6 as in the prior art library apparatus. As noted earlier, the reason why the inversion units 10 are employed is that each of the drive units 5 can always drive only a predetermined one surface of each of the DVDs 2 and thus it is sometimes necessary to turn the DVD 2 180° upside down to correspond to the predetermined driving direction of the drive unit 5. Because each of the double-side recording type DVDs 2 that is to be driven after inversion is thus inverted by the inversion unit 10, both the single-side recording type DVD and the double-side recording type DVD can be transported via the common transport mechanism 6 to the drive unit 5, without a need for the transport mechanism 6 itself to perform the inversion of the double-side recording type DVDs.

Further, according to the embodiment of the present invention, each of the inversion units 10 can be removably installed in any selected one of the six magazine-installing areas. Thus, depending on a frequency of necessity of inverting the double-side recording type DVDs 2, the installed position of each of the inversion units 10 relative to the drive units 5 can be varied optionally. Namely, in the illustrated example, many of the DVDs 2 stored in the magazines 4 located to the left of the transport mechanism 6 are of the single-side recording type that need not be inverted; for this reason, the inversion unit 10 associated with the left-side magazines 4 (i.e., left-side inversion unit) is provided in one of the magazine-installing areas farther from the left-side drive unit 5 than the left-side magazines 4. Thus, the single-side recording type DVDs 2, constituting the majority of the DVDs 2 in the left-side magazines 4, can be quickly transported via the transport mechanism 6 to the left-side drive unit 5, because the necessary traveling distance to the drive unit 5 is short.

On the other hand, many of the DVDs 2 stored in the magazines 4 located to the right of the transport mechanism 6 are of the double-side recording type that need be inverted; for this reason, the inversion unit 10 associated with the right-side magazines 4 (i.e., the right-side inversion unit) is provided in one of the magazine-installing areas closer to the right-side drive unit 5 than the right-side magazines 4. Thus, the double-side recording type DVDs 2, constituting the majority of the DVDs 2 in the right-side magazines 4, can be quickly inverted by the inversion unit 10 and then transported via the transport mechanism 6 to the right-side drive unit 5.

Because the inversion units 10 are provided separately from the transport mechanism 6 in the described embodiment, the inversion of one DVD 2 by the inversion unit 10 and the transport of another DVD 2 by the transport mechanism 6 can be performed concurrently in a parallel fashion, which can greatly enhance the processing speed of the library apparatus. Further, the installed positions of the inversion units 10 relative to the drive units 5 can be changed depending on the frequency of necessity inverting the DVDs 2, the DVDs can be transported by the transportation mechanism 6 with increased efficiency, and thus the processing speed and efficiency can be enhanced even further. Furthermore, by providing a plurality of the inversion units 10 as in the illustrated example, the necessary DVD inversion and transport operations can be performed concurrently in a parallel fashion, so that an even further increase in the processing speed is achieved.

Whereas the embodiment has been described as including the magazines 4, inversion units 10 and drive units 5 on both sides of the transport mechanism6, the basic principles of the present invention may of course be applied to a DVD library apparatus where the magazine 4, inversion unit 10 and drive unit 5 are provided 5 only on one side of the transport mechanism6.

Further, the DVDs handled by the DVD library apparatus of the present invention are not limited to bare DVDs as described above and may be cartridge-type DVDs contained in respective cases. Generally, in the DVD library apparatus handling such case-contained DVDs, the DVDs will each be stored, transported etc. without being placed on the trays.

Furthermore, the basic principles of present invention may be applied to any other recording media library apparatus than the DVD library apparatus, such as those which mixedly store and process single-side recording type and double-side recording type recording media other than the DVDs.

In summary, the present invention is characterized primarily in that the inversion unit for inverting the recording medium of the double-side recording type is provided separately from the transport mechanism, the inversion of one recording medium and the transport of another recording medium can be performed concurrently in a parallel fashion, so that the processing speed of the recording media library apparatus can be increased to a significant degree.

What is claimed is:

1. A recording media library apparatus capable of storing and processing recording media of a double-side recording type, said recording media library apparatus comprising:

a plurality of storage units, removably installed in a plurality of predetermined installing areas within said recording media library apparatus, each of said storage units being capable of storing a plurality of the recording media;

a drive unit for driving a desired one of the recording media in a predetermined driving direction;

a transport mechanism for transporting a desired one of the recording media between one of said storage units and said drive unit, said transport mechanism is separate from said drive unit;

an inversion unit that inverts a desired one of the recording media to correspond to the predetermined driving direction of said drive unit, wherein said inversion unit is physically distinct from said transport mechanism, said storage units and said drive unit, wherein said inversion is removably installed in any one of the predetermined installing areas, and wherein when a desired one of the recording media of the double-side recording type is to be driven for data writing/reading on a particular side thereof, said desired one of the recording media is transported from one of said storage units or said drive unit to said inversion unit via said transport mechanism.

2. A recording media library apparatus as recited in claim 1 which is capable of mixedly storing recording media of both a single-side recording type and the double-side recording type.

3. A recording media library apparatus as recited in claim 1 wherein said recording media are DVDs.

4. A recording media library apparatus as recited in claim 1, wherein transport of one recording medium by said transport mechanism and inversion of another recording medium by said inversion unit can be performed concurrently in a parallel fashion.

* * * * *